US012777254B2

(12) United States Patent
Narita et al.

(10) Patent No.: US 12,777,254 B2
(45) Date of Patent: Oct. 27, 2026

(54) IMAGE CAPTURING APPARATUS AND CONTROL METHOD THEREOF, AND IMAGE PROCESSING APPARATUS AND METHOD

(71) Applicant: CANON KABUSHIKI KAISHA, Tokyo (JP)

(72) Inventors: Yu Narita, Kanagawa (JP); Masafumi Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 18/824,107

(22) Filed: Sep. 4, 2024

(65) Prior Publication Data

US 2024/0430571 A1 Dec. 26, 2024

Related U.S. Application Data

(63) Continuation of application No. PCT/JP2022/015719, filed on Mar. 29, 2022.

(51) Int. Cl.

*H04N 23/68* (2023.01)
*H04N 23/62* (2023.01)
*H04N 23/667* (2023.01)

(52) U.S. Cl.

CPC ........... *H04N 23/687* (2023.01); *H04N 23/62* (2023.01); *H04N 23/667* (2023.01); *H04N 23/6811* (2023.01); *H04N 23/683* (2023.01)

(58) Field of Classification Search

CPC .... H04N 23/687; H04N 23/62; H04N 23/683; H04N 23/6811; H04N 23/6812; G03B 5/00

See application file for complete search history.

(56) References Cited

U.S. PATENT DOCUMENTS

2017/0064201 A1* 3/2017 Tsuchiya ................ H04N 23/80
2023/0171494 A1* 6/2023 Tanaka ............... H04N 23/6812 348/208.2

(Continued)

FOREIGN PATENT DOCUMENTS

JP 2007272459 A 10/2007
JP 2012242563 A 12/2012

(Continued)

OTHER PUBLICATIONS

The above foreign patent documents were cited in the Sep. 6, 2024 Japanese Office Action, which is enclosed without an English Translation, that issued in Japanese Patent Application No. 2021-003728.

(Continued)

*Primary Examiner* — Kelly L Jerabek

(74) *Attorney, Agent, or Firm* — Cowan, Liebowitz & Latman, P.C.

(57) ABSTRACT

An image capturing apparatus comprises: an image sensor that photoelectrically converts light incident via an imaging optical system and outputs an image; a shake detection unit that detects shake of the image capturing apparatus; and an actuation unit that performs translational actuation and rotational actuation on the image sensor in a plane perpendicular to an optical axis of the imaging optical system so as to correct the shake detected by the shake detection unit. In a case where each of a plurality of images output from the image sensor is aligned by translational actuation by an integer multiple of pixel and the plurality of aligned images are synthesized, the actuation unit performs the rotational actuation in preference to the translational actuation.

19 Claims, 12 Drawing Sheets

(56) References Cited

U.S. PATENT DOCUMENTS

| | | | | |
|---|---|---|---|---|
| 2023/0209194 | A1 * | 6/2023 | Kawai | H04N 23/667<br>348/208.2 |
| 2024/0305887 | A1 * | 9/2024 | Tanaka | H04N 23/6812 |
| 2024/0328790 | A1 * | 10/2024 | Yamashita | G02B 27/646 |

FOREIGN PATENT DOCUMENTS

| | | | |
|---|---|---|---|
| JP | 2017046301 | A | 3/2017 |
| JP | 2017129785 | A | 7/2017 |
| JP | 2018189730 | A | 11/2018 |
| JP | 2022052532 | A | 4/2022 |

OTHER PUBLICATIONS

Foreign Patent Documents #1 and 3-5 were cited in the International Search Report dated Jun. 21, 2022, of International Application No. PCT/JP2022/015719, a copy of which is enclosed without an English translation.

* cited by examiner

IMAGE CAPTURING APPARATUS AND CONTROL METHOD THEREOF, AND IMAGE PROCESSING APPARATUS AND METHOD

CROSS-REFERENCE TO RELATED APPLICATIONS

This application is a Continuation of International Patent Application No. PCT/JP2022/015719, filed Mar. 29, 2022, which is hereby incorporated by reference herein in their entirety.

BACKGROUND OF THE INVENTION

Field of the Invention

The present invention relates to an image capturing apparatus and a control method thereof, and an image processing apparatus and method, and more particularly to an image stabilization technique in an image capturing apparatus.

Background Art

In recent years, with the advancement of image capturing apparatuses, many of them are equipped with a technology for correcting camera shake by moving an image sensor (sensor-shift stabilization). In this sensor-shift stabilization technology, many sensor-shift stabilization mechanisms have been proposed that are capable of rotational movement around the optical axis direction in addition to translational movement within a plane perpendicular to the optical axis.

Another type of image stabilization is a technique (electronic image stabilization) which corrects camera shake by electronically aligning shot images so that they overlaps with a reference image. Another type of image stabilization is a technique (referred to as image synthesis stabilization" hereinafter) which aligns and synthesizes a plurality of images to obtain an image with an exposure equivalent to a long exposure. Electronic image stabilization does not require image synthesis, and is often used for moving images that require real-time performance. On the other hand, image synthesis stabilization requires synthesis processing and is designed for long exposures, so it is generally used for still images.

Furthermore, PTL1 discloses a technique for correcting camera shake by coordinating the sensor-shift stabilization for correcting rotational shake by rotating an image sensor, with the electronic image stabilization.

Generally, in image stabilization for still images, the image quality of each image is considered important, while in image stabilization for moving images, the time-series stability of the images is considered important. Thus, what is required in the image synthesis stabilization for still images and what is required in the electronic image stabilization for moving images are different, so if the sensor-shift stabilization or the electronic image stabilization is performed for still images and moving images using the same method, the desired image quality of either the still images or the moving images may not be obtained.

The present invention has been made in consideration of the above situation, and has as its object to perform sensor-shift stabilization control suitable for moving images and still images.

A second object of the present invention is to improve the quality of a synthesized image in a case where a plurality of images are synthesized.

CITATION LIST

Patent Literature

PTL1: Japanese Patent Laid-Open No. 2012-242563

SUMMARY OF THE INVENTION

In order to achieve the above object, provided is an image capturing apparatus comprising: image sensor for photoelectrically converting light incident via an imaging optical system and outputting an image; shake detection unit for detecting shake of the image capturing apparatus; and actuation unit for performing translational actuation and rotational actuation on the image sensor in a plane perpendicular to an optical axis of the imaging optical system so as to correct the shake detected by the shake detection unit, wherein, in a case where a plurality of images output from the image sensor are synthesized, the actuation unit performs the rotational actuation in preference to the translational actuation.

Further features of the present invention will become apparent from the following description of exemplary embodiments with reference to the attached drawings.

DESCRIPTION OF THE EMBODIMENTS

Figure 1A:
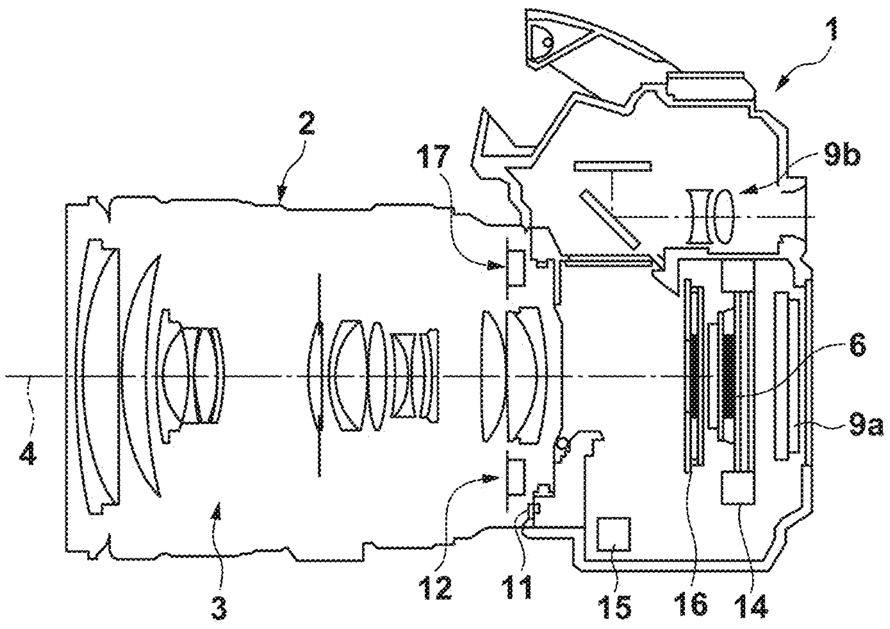
FIG. 1A is a cross-sectional view taken at the center of an image capturing system according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1B:
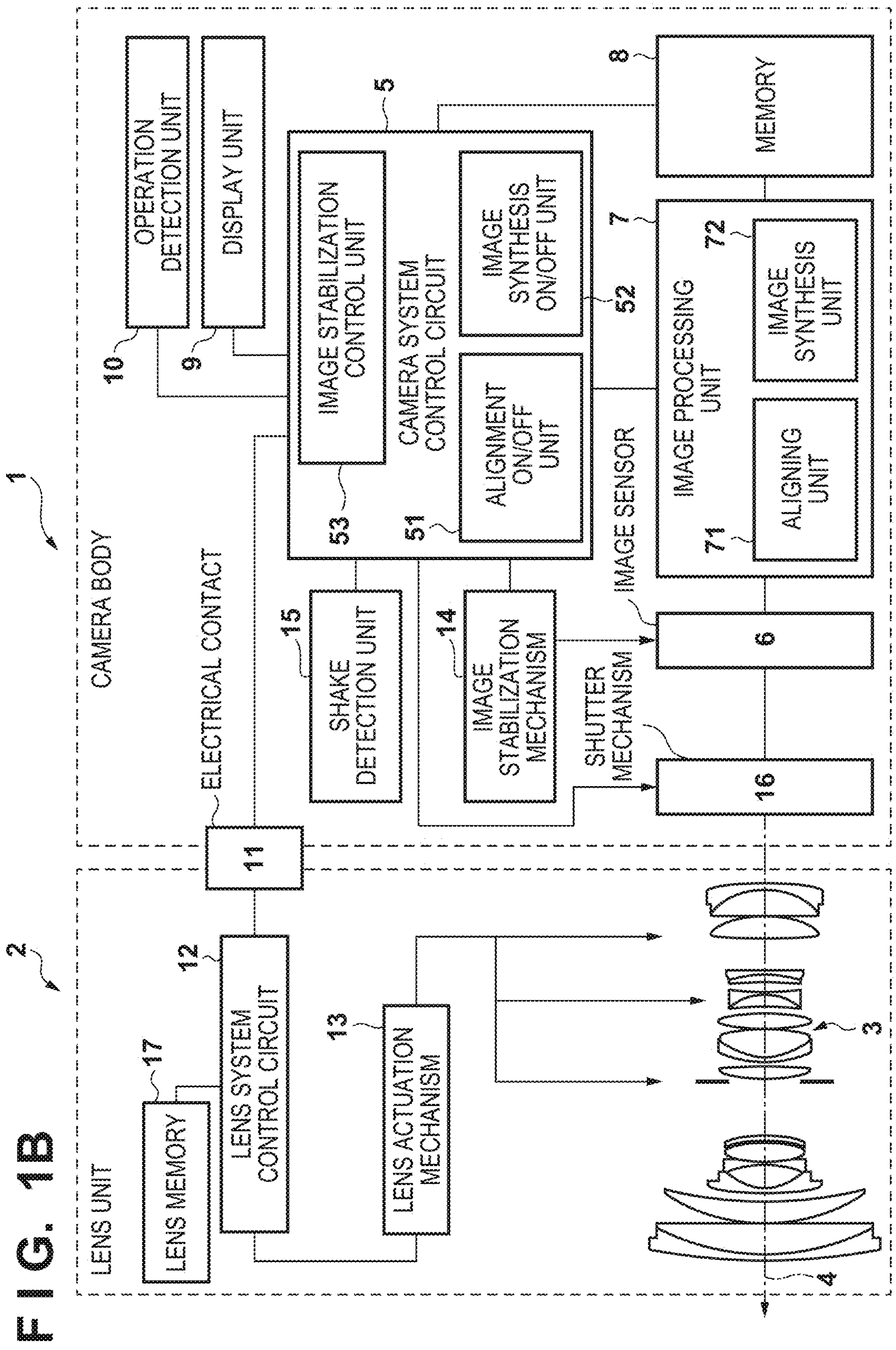
FIG. 1B is a block diagram illustrating a brief configuration of the image capturing system according to the first embodiment of the present invention.

FIGS. 1A and 1B illustrates an image capturing apparatus according to an embodiment of the present invention. FIG. 1A is a cross-sectional view taken at the center of an image capturing system as an image capturing apparatus according to an embodiment of the present invention, and FIG. 1B is a block diagram illustrating the schematic configuration of the image capturing system.

As shown in FIG. 1A, the image capturing system of this embodiment mainly comprises a camera body 1 and a lens unit 2 that is detachable from the camera body 1. The camera body 1 and the lens unit 2 are electrically connected via an electrical contact 11. Note that the image capturing apparatus of the present invention is not limited to this configuration, and may be an image capturing apparatus in which the camera body and the lens unit are integrally configured.

The lens unit 2 includes an imaging optical system 3 arranged on an optical axis 4 and consisting of a plurality of lenses, including a focus lens, a zoom lens and an image stabilization lens, and an aperture, a lens system control circuit 12, and a lens memory 17. The camera body 1 includes an image sensor 6, a rear display device 9*a*, an EVF 9*b*, an image stabilization mechanism 14, a shake detection unit 15, and a shutter mechanism 16.

FIG. 1B is a diagram showing an electrical configuration of the image capturing system, in which the lens unit 2 further includes a lens actuation mechanism 13 that moves the focus lens, zoom lens, image stabilization lens, aperture, etc. included in the imaging optical system 3. The camera body 1 further includes a camera system control circuit 5, an image processing unit 7, a memory 8, a display unit 9, and an operation detection unit 10. The display unit includes a rear display device 9*a* and an EVF 9*b*.

In the image capturing system having the above configuration, light from a subject incident via the imaging optical system 3 is converged on the imaging surface of the image sensor 6. The image sensor 6 photoelectrically converts the incident light and outputs an electrical signal (image signal) corresponding to the amount of light. The image sensor 6 can output image signals of images in various formats such as so-called still images and moving images, and can output moving images in a plurality of formats by changing the aspect ratio, resolution of images to be recorded, etc. In addition, the image capturing system of this embodiment has a mode (dynamic range expansion, noise reduction, etc.) for capturing and synthesizing a group of temporally consecutive still images, and there are cases in which a group of images is captured that is temporally consecutive, regardless of whether they are still images or moving images.

The image processing unit 7 includes an A/D converter, a white balance adjustment circuit, a gamma correction circuit, an interpolation calculation circuit, etc., and processes the image signal output from the image sensor 6 to generate image data for recording.

The image processing unit 7 is also connected to the camera system control circuit 5. The camera system control circuit 5 can obtain a focus evaluation value and an exposure amount based on the image signal from the image sensor 6 processed by the image processing unit 7, and obtain an in-focus position and exposure conditions (F-number, shutter speed, etc.) based on these values. The camera system control circuit 5 then issues a command to the lens system control circuit 12 via the electrical contact 11 based on the obtained focus position and exposure conditions, and the lens system control circuit 12 controls the lens actuation mechanism 13 based on the command. The shutter mechanism 16 controls the incidence/shielding of the subject image on the image sensor 6 by moving the shutter curtain. Through the above control, the image sensor 6 is exposed with an appropriate amount of light, and the subject image is formed near the image sensor 6.

The image processing unit 7 in this embodiment also includes an aligning unit 71 that performs electronic image stabilization by shifting and aligning the positions of a plurality of images, and an image synthesis unit 72 that synthesizes the plurality of images. Specific operations of the aligning unit 71 and the image synthesis unit 72 will be described later. The image processing unit 7 also compresses data such as images, moving images, and audio using a predetermined method.

The memory 8 has a storage unit for images, and the camera system control circuit 5 outputs images to the recording unit of the memory 8.

Under the control of the camera system control circuit 5, the display unit 9 turns off the rear display device 9*a* and displays images and information on the EVF 9*b* when the user is looking into the EVF 9*b*, and displays images and information on the rear display device 9*a* when the user is not looking into the EVF 9*b*. The rear display device 9*a* functions as a touch panel and is connected to the operation detection unit 10.

The shake detection unit 15 can detect translational shake in the translation direction on a plane perpendicular to the optical axis 4 and rotational shake of the apparatus in the rotation direction around the optical axis 4, and a vibration gyro, an acceleration sensor, or the like may be used. Shake may also be detected by comparing images between frames based on the image signal output from the image sensor 6. The image stabilization mechanism 14 is a mechanism that translates the image sensor 6 in a plane perpendicular to the optical axis 4 and rotates it around the optical axis 4, and the specific structure thereof will be described later with reference to FIG. 2.

The camera system control circuit 5 generates and outputs timing signals and the like when shooting an image. In addition, in response to an external operation detected by the operation detection unit 10, the camera system control circuit 5 controls shooting processing, image processing, and recording/playback processing. For example, when the operation detection unit 10 detects that a shutter release button (not shown) is pressed, the camera system control circuit 5 controls the actuation of the image sensor 6, the operation of the image processing unit 7, the operation of the compression process, and the like. The camera system control circuit 5 also includes an alignment on/off unit 51 and an image synthesis on/off unit 52 for turning on/off the operations of the aligning unit 71 and the image synthesis unit 72, respectively, included in the image processing unit 7, and further includes an image stabilization control unit 53. The image stabilization control unit 53 generates a target value for the actuation amount of the image sensor 6 by the image stabilization mechanism 14 based on the signal from the shake detection unit 15 according to the on/off statuses of alignment and image synthesis, as described below, and performs image stabilization (sensor-shift stabilization) control.

In addition, in a mode in which normal image stabilization is performed, the camera system control circuit 5 can also perform known optical image stabilization by controlling the image stabilization lens included in the imaging optical system 3 via the lens actuation mechanism 13 based on a signal obtained from the image sensor 6.

Here, a brief description will be given of the flow of sensor-shift stabilization control in the image capturing system having the above configuration.

In this embodiment, the sensor-shift stabilization control is performed using a shake detection unit 15 that detects shake, an image stabilization mechanism 14 that performs sensor-shift stabilization, and an image stabilization control system provided in the camera system control circuit 5. Then, during the so-called framing operation, in which the operation detection unit 10 detects an operation (SW1) of pressing down a shutter release button (not shown) halfway to start a shooting preparation operation, the sensor-shift stabilization is performed using the image stabilization mechanism 14 to facilitate the framing. That is, sensor-shift stabilization is performed by controlling the image stabilization mechanism 14 based on a signal from the shake detection unit 15. After that, when the operation detection unit 10 detects an operation (SW2) of pressing down the shutter release button completely to start a shooting operation, sensor-shift stabilization is performed using the image stabilization mechanism 14 to suppress blurring of the subject image acquired through exposure. When a certain time has elapsed after the exposure, the sensor-shift stabilization operation stops.

Figure 2:
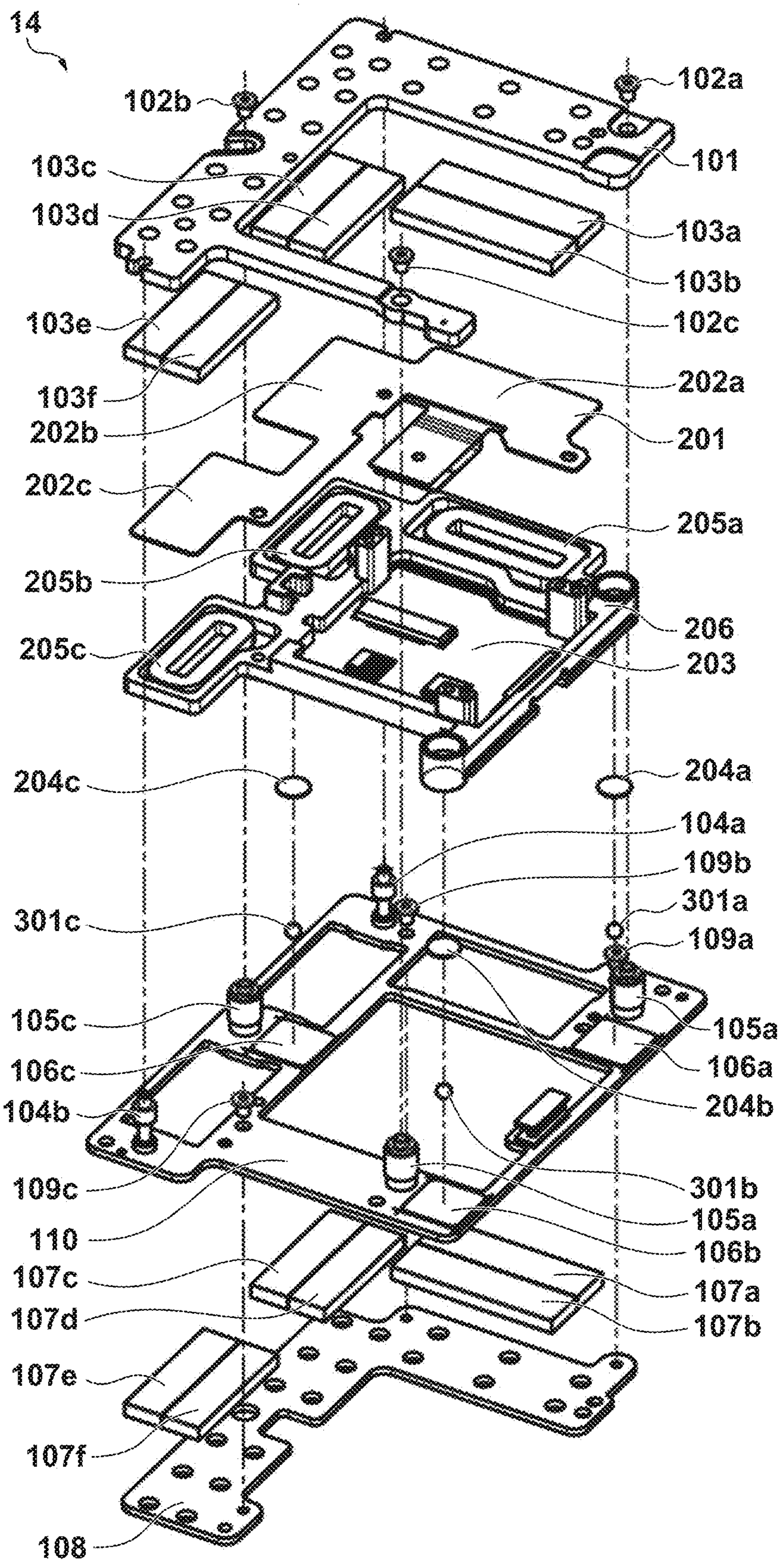
FIG. 2 is an exploded perspective view of an image stabilization mechanism according to the first embodiment.

Next, the image stabilization mechanism 14 of this embodiment will be described with reference to FIG. 2. FIG. 2 is an exploded perspective view of part of the image stabilization mechanism 14 for performing image stabilization. Note that there is a separate electrical mechanism for control, but this is not included in the diagram shown in FIG. 2. In FIG. 2, the vertical lines are parallel to the optical axis. In FIG. 2, non-moving members (fixed parts) are numbered in the 100*s*. Moving members (movable parts) are numbered in the 200*s*. Furthermore, balls held between the fixed parts and the movable parts are numbered in the 300*s*.

In FIG. 2, 101 denotes an upper yoke, 102*a*, 102*b*, and 102*c* denote screws, 103*a*, 103*b*, 103*c*, 103*d*, 103*e*, and 103*f* denote upper magnets, 104*a* and 104*b* denote auxiliary spacers, 105*a*, 105*b*, and 105*c* denote main spacers, 106*a*, 106*b*, and 106*c* denote fixed part rolling plates, 107*a*, 107*b*, 107*c*, 107*d*, 107*e*, and 107*f* denote lower magnets, 108 denotes a lower yoke, 109*a*, 109*b*, and 109*c* denote screws, and 110 denotes a base plate.

Reference numeral 201 denotes an FPC, 202*a*, 202*b*, and 202*c* denote position detection element mounting positions, 203 denotes a movable PCB, 204*a*, 204*b*, and 204*c* denote movable part rolling plates, 205*a*, 205*b*, and 205*c* denote coils, 206 denotes a movable frame, and 301*a*, 301*b*, and 301*c* denote balls.

The upper yoke 101, the upper magnets 103*a*, 103*b*, 103*c*, 103*d*, 103*e*, and 103*f*, the lower magnets 107*a*, 107*b*, 107*c*, 107*d*, 107*e*, and 107*f*, and the lower yoke 108 form a magnetic circuit, which forms a so-called closed magnetic path. The upper magnets 103*a*, 103*b*, 103*c*, 103*d*, 103*e*, and 103*f* are adhered and fixed in a state of being attracted to the upper yoke 101. Similarly, the lower magnets 107*a*, 107*b*, 107*c*, 107*d*, 107*e*, and 107*f* are adhered and fixed in a state of being attracted to the lower yoke 108. The upper magnets 103*a*, 103*b*, 103*c*, 103*d*, 103*e*, and 103*f* and the lower magnets 107*a*, 107*b*, 107*c*, 107*d*, 107*e*, and 107*f* are magnetized in the optical axis direction ((vertical direction in FIG. 2). Furthermore, adjacent magnets (as those in the positional relationship between magnets 103*a* and 103*b*) are magnetized in different directions. Furthermore, opposing magnets (as those in the positional relationship between magnets 103*a* and 107*a*) are magnetized in the same direction. In this way, a strong magnetic flux density is generated between the upper yoke 101 and the lower yoke 108 in the optical axis direction.

Since a strong attraction force occurs between the upper yoke 101 and the lower yoke 108, the main spacers 105*a*, 105*b*, and 105*c* and the auxiliary spacers 104*a* and 104*b* are configured to maintain an appropriate distance between them. The appropriate distance is a distance that allows the coils 205*a*, 205*b*, and 205*c* and the FPC 201 to be placed between the upper magnets 103*a*, 103*b*, 103*c*, 103*d*, 103*e*, and 103*f* and the lower magnets 107*a*, 107*b*, 107*c*, 107*d*, 107*e*, and 107*f* while ensuring an appropriate gap. The main spacers 105*a*, 105*b*, and 105*c* have screw holes, and the upper yoke 101 is fixed to the main spacers 105*a*, 105*b*, and 105*c* by the screws 102*a*, 102*b*, and 102*c*.

Rubber is provided on the lateral portions of the main spacers 105*a*, 105*b*, and 105*c*, forming the mechanical ends (so-called stoppers) of the movable parts.

The base plate 110 has holes while avoiding the lower magnets 107*a*, 107*b*, 107*c*, 107*d*, 107*e*, and 107*f*, and the surfaces of the magnets protrude from the holes. That is, the base plate 110 and the lower yoke 108 are fixed by the screws 109*a*, 109*b*, and 109*c*, and the lower magnets 107*a*, 107*b*, 107*c*, 107*d*, 107*e*, and 107*f*, which have a larger dimension in the thickness direction than the base plate 110, are fixed so as to protrude from the base plate 110.

The movable PCB 203 is made of magnesium die-cast or aluminum die-cast, and is lightweight and highly rigid. Each element of the movable part is fixed to the movable PCB 203 to form the movable part. Position detection elements are attached to the FPC 201 on the surface that is not visible in FIG. 2 at the positions indicated by the position detection element mounting positions 202*a*, 202*b*, and 202*c*. For example, Hall elements or the like can be used to detect the position using the magnetic circuits described above. Since a Hall element is small, Hall elements are arranged so as to be nested inside the windings of the coils 205*a*, 205*b*, and 205*c*.

The image sensor 6 (not shown), coils 205*a*, 205*b*, and 205*c*, and Hall elements are connected to the movable PCB 203. Electrical communication with the outside is performed via a connector on the movable PCB 203.

The fixed part rolling plates 106*a*, 106*b*, and 106*c* are adhesively fixed to the base plate 110, and the movable part rolling plates 204*a*, 204*b*, and 204*c* are adhesively fixed to the movable PCB 203, forming the rolling surfaces for the balls 301*a*, 301*b*, and 301*c*. By providing the rolling plates separately, it becomes easy to design the surface roughness, hardness, and other properties to a desired state.

In the above-mentioned configuration, by passing a current through the coils 205*a*, 205*b*, and 205*c*, a force according to Fleming's left-hand rule is generated, and the movable frame 206 can be moved. In addition, feedback control can be performed by using the signal from the Hall elements, which are the position detection elements described above. By appropriately controlling the value of the signal to the Hall elements, it is possible to move the movable frame 206 in translational motion in a plane perpendicular to the optical axis and to rotate the movable frame 206 around the optical axis.

By actuating such that the signals from the Hall elements at the position detection element mounting positions 202*b* and 202*c* have opposite phases while keeping the signal from the Hall element at the position detection element mounting positions 202*a* constant, it is possible to produce rotational motion of the movable frame 206 approximately around optical axis 4.

The magnetic flux densities in the optical axis direction are detected at the position detection element mounting positions 202*a*, 202*b*, and 202*c*. The characteristics of the magnetic circuit consisting of the upper magnets 103*a*, 103*b*, 103*c*, 103*d*, 103*e*, and 103*f* and the lower magnets 107*a*, 107*b*, 107*c*, 107*d*, 107*e*, and 107*f* are generally nonlinear. Therefore, the magnetic flux densities detected at the position detection element mounting positions 202*a*, 202*b*, and 202*c* do not necessarily have a constant resolution in the entire actuation range, so the detection resolution changes. T This is because there are positions where the change in magnetic flux density is steep and positions where it is gentle, and at the position where the change is steeper, the higher the detection resolution, that is, the larger the change in magnetic flux density relative to the amount of movement. In the magnetic circuit shown in FIG. 2, the change in magnetic flux density is the largest at the boundary position of the magnets (for example, the boundary position between the upper magnets 103*a* and 103*b*), and the detection resolution is high at the boundary position.

Since many proposals have been made regarding the control method of the image stabilization mechanism 14, a detailed explanation will be omitted here.

Figure 3:
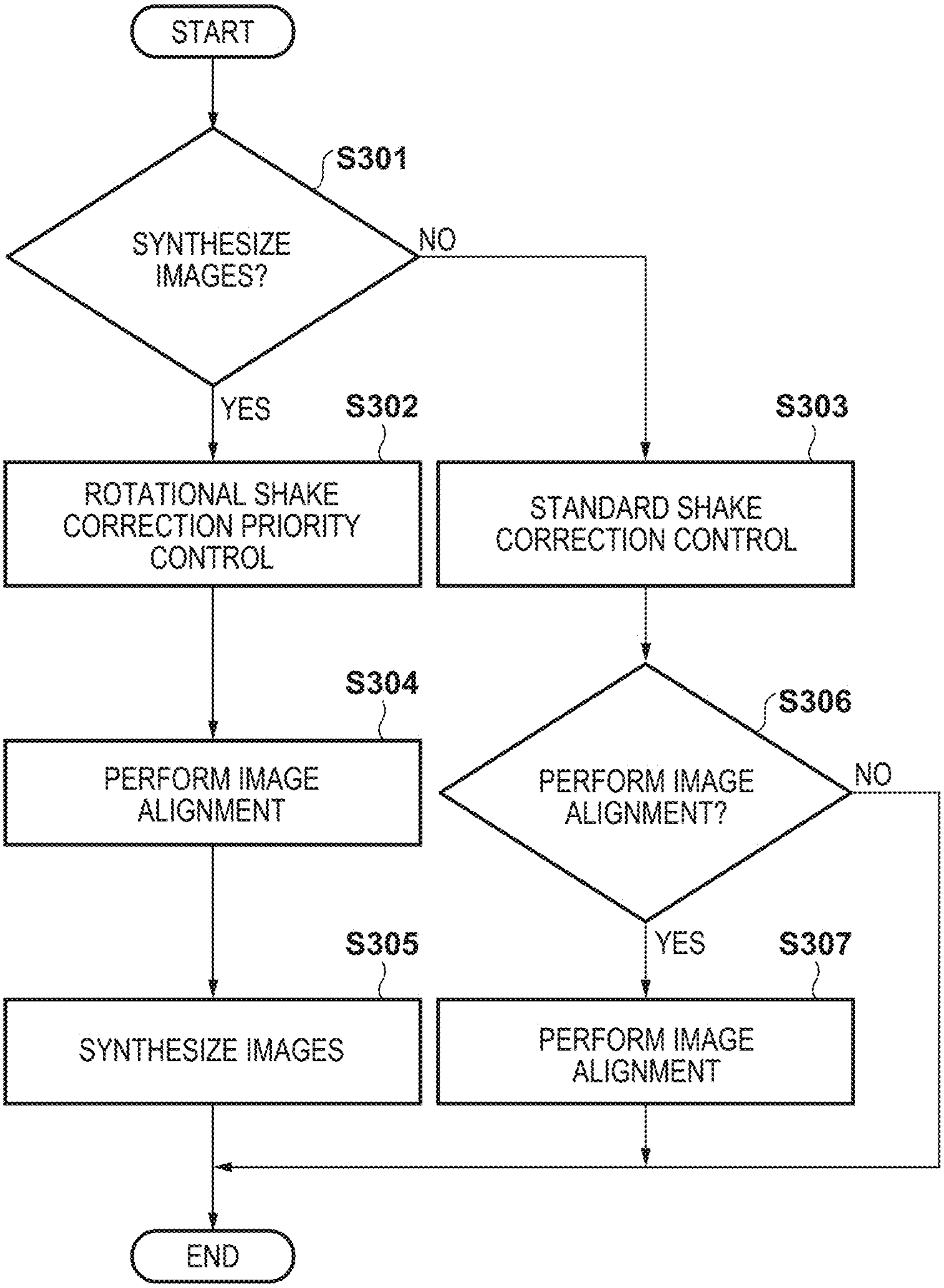
FIG. 3 is a flowchart explaining processing in the first embodiment.

Next, the processing performed in the camera body 1 having the above configuration will be described with reference to the flowchart shown in FIG. 3.

In step S301, the image synthesis on/off unit 52 in the camera system control circuit 5 controls whether or not to perform image synthesis. Note that the user may be able to directly instruct whether or not to perform image synthesis, or it may be automatically switched depending on the camera settings such as the shooting mode and the shooting conditions such as the shutter speed. For example, image synthesis is performed if the shutter speed is slower than a threshold in the still image shooting mode, and image synthesis is not performed in the moving image shooting mode or if the shutter speed is faster than the threshold in the still image shooting mode. Note that image synthesis is performed after alignment by the aligning unit 71, so if image synthesis is performed, the alignment on/off unit 51 is also turned on.

If image synthesis is performed, the process proceeds to step S302, and if image synthesis is not performed, the process proceeds to step S303.

In step S302, the image stabilization control unit 53 of the camera system control circuit 5 controls the sensor-shift stabilization so as to preferentially correct rotational shake between translational shake and rotational shake (roll shake). Hereinafter, this control is referred to as "rotational shake correction priority control." The reason for preferentially correcting rotational shake is to suppress image quality degradation caused by image alignment in step S304 and image synthesis in step S305, which will be described later. This control is suitable for performing the image synthesis stabilization accompanied by image alignment in still image shooting where image quality is important.

Figure 4:
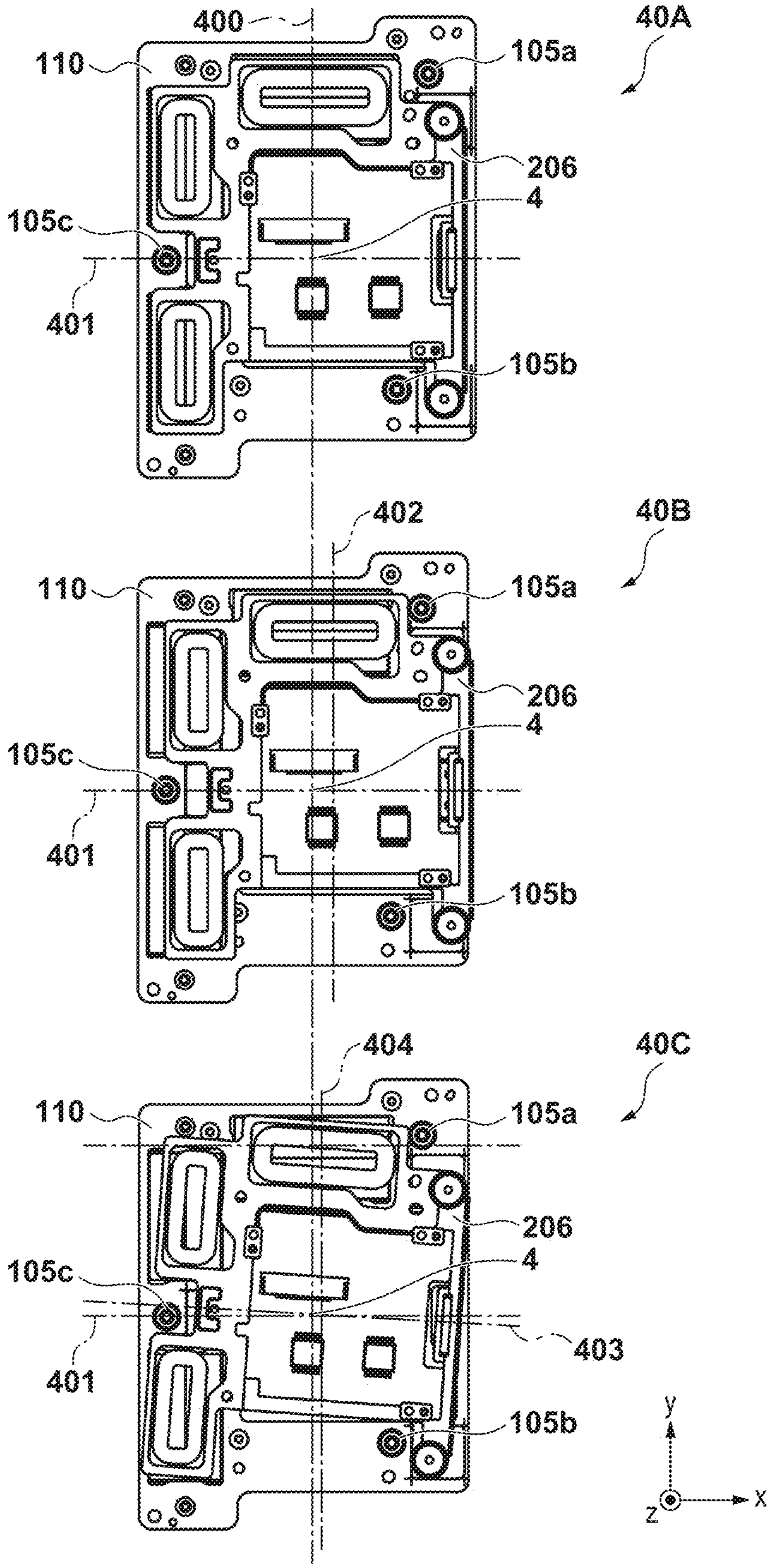
FIG. 4 is a diagram explaining the relationship between rotation and translation of the image stabilization mechanism in the first embodiment.

Here, the relationship between rotation and translation of the image stabilization mechanism 14 in this embodiment will be described with reference to FIG. 4. FIG. 4 is a diagram of the image stabilization mechanism 14 shown in FIG. 2 as viewed from the optical axis 4 direction (the Z-axis direction of the coordinate system at the lower right). The coordinate system at the lower right of FIG. 4 is common to 40A, 40B, and 40C in FIG. 4. 40A shows a state in which the movable frame 206 is not moved, 40B shows a state in which the movable frame 206 is moved in the positive X direction without rotation, and 40C shows a state in which the movable frame 206 is moved in the positive X direction with rotation.

A dot-dash line 400 drawn in common to 40A, 40B, and 40C in FIG. 4 indicates a reference line indicating the reference of the fixed part in the X direction, and a dashed line 401 indicates a reference line indicating the reference of the fixed part in the Y direction. In 40B, a dot-dash line 402 indicates a reference line after the movable frame 206 is moved in the positive X direction. In 40C, a dashed line 403 indicates a reference line after the movable frame 206 is rotated, and a dot-dash line 404 indicates a reference line after the movable frame 206 is moved in the positive X direction. In 40A, the reference line of the movable frame 206 overlaps with the reference line of the fixed part. In other words, it is in a non-moving state.

40B shows a state in which the movable frame 206 is moved in the positive X direction until it comes into contact with the main spacer 105*a* without rotating the movable frame 206. In other words, the movable frame 206 can move in the positive X direction by an amount equivalent to the interval between the reference line 400 and the reference line 402.

40C shows a state in which the movable frame 206 is rotated and moved in the positive X direction until it comes into contact with the main spacer 105*a*. The amount of rotation is shown as the angle formed by the reference line 401 and the reference line 403. The amount of movement of the movable frame 206 in the X direction at this time corresponds to the distance between the reference line 400 and the reference line 404.

As will be apparent by comparing 40B and 40C, the possible amount of translation in the X direction changes when rotation occurs. In order to suppress this change, a mechanical end may be provided for the movable frame 206 on the optical axis 4, but this is not easy due to the presence of the image sensor 6 and the processing board behind it. For this reason, the mechanical end for the movable part (main spacers 105*a*, 105*b*, and 105*c* in the examples of FIGS. 2 and 4) is generally provided at a position different from the optical axis 4.

Also, as will be apparent from 40C, the gap in the Y direction between the main spacer 105*c* and the movable frame 206 changes compared to the case where no rotation occurs. In other words, it can be seen that the possible amount of movement in the positive Y direction also decreases due to rotation.

Although 40B and 40C do not show a specific relationship between the amount of rotation and the amount of translation, it is clear from 40C that, in general, as the amount of rotation increases, the possible amount of translation decreases. In addition, to obtain a specific relationship, the position of the mechanical end for the movable part may be determined and a numerical calculation may be performed. In order to have a margin for the amount of rotation and the amount of translation, the main spacers 105*a*, 105*b*, and 105*c* may be designed away from the movable frame 206, but this leads to an increase in the size of the device. Since the camera body 1 is used by a user while being carried around, it is very meaningful not to increase the size of the device.

As described above, since the rotation amount limits the maximum translation amount and vice versa, in step S302, the upper limit value of a rotational shake correction amount (rotational actuation amount) is set higher than the upper limit value of a translational shake correction amount (translational actuation amount), thereby giving priority to compensating rotational shake.

In step S304, the aligning unit 71 of the image processing unit 7 detects misalignment between a plurality of images input from the image sensor 6, and performs geometric deformation on the images to correct the misalignment.

The misalignment between images can be detected by calculating the similarity between the images using a known template matching method or the like. In geometric transformation, the image is subjected to an affine transformation or a projective transformation to correct the misalignment in the translation and rotation directions of the image. This alignment realizes electronic image stabilization.

In addition, geometric transformation requires that each pixel of the image before and after transformation correspond to each other. In a case of translating or rotating an image by sub-pixel scale, one-to-one correspondence cannot be achieved between the pixels, so it is common to use pixels each interpolated from a plurality of surrounding pixels to establish correspondence.

However, this pixel interpolation reduces the image resolution and causes image quality degradation. Therefore, in order to prevent image quality degradation, it is desirable to avoid translation and rotation by sub-pixel scale. Regarding translation, by limiting movement to movement by integer multiple of pixel, it is possible to avoid image quality degradation caused by pixel interpolation, although the alignment accuracy decreases. Furthermore, if the rotational shake correction priority control in step S302 is used, rotational shake is sufficiently corrected by the image stabilization mechanism 14, making rotational movement unnecessary and avoiding image quality degradation.

In step S305, the image synthesis unit 72 of the image processing unit 7 synthesizes the plurality of images aligned in step S304 by adding them together. This achieves the image synthesis stabilization. Note that in a case where each of the plurality of images is shot with the proper exposure, it is necessary to take the average after adding the images.

On the other hand, in a case where image synthesis is not performed, in step S303, the image stabilization control unit 53 controls the sensor-shift stabilization so as to correct translational shake and rotational shake in a well-balanced manner. Hereinafter, this control is called "standard shake correction control." This control is suitable for image stabilization in moving image shooting, where time-series stability is important. It is also suitable for still image shooting when image alignment is not performed, that is, when the image synthesis stabilization is not performed.

In the standard shake correction control, compared to the rotational shake correction priority control in step S302, the upper limit of the rotational shake correction amount is set lower and approximately the same as the upper limit of the translational shake correction amount, thereby achieving balanced correction of translational shake and rotational shake.

Next, in step S306, the alignment on/off unit 51 of the camera system control circuit 5 controls whether or not to perform image alignment. The user may directly set whether or not to perform image alignment, or on/off of the image alignment may be automatically switched according to the camera settings and shooting conditions. For example, image alignment is performed in the moving image shooting mode, and image alignment is not performed in a case where the shutter speed is faster than a threshold in the still image shooting mode.

If image alignment, i.e., the electronic image stabilization, is to be performed, the process proceeds to step S307, and if the electronic image stabilization is not to be performed, the process ends.

In step S307, the same image alignment process as in step S304 is performed, and the process ends.

As described above, according to the first embodiment, in a case where the image synthesis stabilization is performed, the sensor-shift stabilization is performed under the rotational shake correction priority control, thereby enabling image stabilization suitable for still images that prioritize image quality. Also, in a case where the image synthesis stabilization is not performed, the sensor-shift stabilization is performed under the standard shake correction control, thereby enabling image stabilization suitable for moving images that prioritize stability.

In the above embodiment, an example has been described in which rotational shake is preferentially corrected by setting the upper limit of the rotational shake correction amount (rotational actuation amount) higher than the upper limit of the translational shake correction amount (translational actuation amount) in the rotational shake correction priority control. However, the method of correcting rotational shake with priority over translational shake is not limited to this. For example, the rotational shake correction amount may be calculated first, and the translational shake may be corrected within the remaining movable range. In addition, if the total of the rotational shake correction amount and the translational shake correction amount exceeds the movable range, a gain used when acquiring the rotational shake correction amount based on the detected rotational shake may be made larger than a gain used when acquiring the translational shake correction amount based on the detected translational shake, so that the rotational shake is preferentially corrected. The gain can be set to a correction amount such that the detected shake is 100% corrected when the gain is 1.

Second Embodiment

Next, a second embodiment of the present invention will be described.

In the first embodiment, the image stabilization mechanism 14 translates the image sensor 6 in a plane perpendicular to the optical axis 4 and rotates it around the optical axis 4. In the second embodiment, in addition to the configuration shown in FIG. 4, the image stabilization mechanism 14 further includes a mechanism for rotating the image sensor 6 around two axes that are perpendicular to the optical axis 4. This mechanism allows the sensor-shift stabilization to correct not only translational and rotational shake, but also tilt components caused by camera shake in the yaw and pitch directions (hereinafter referred to as "tilt shake"). Note that the overall configuration of the image capturing system is the same as that shown in FIG. 1A and FIG. 1B, so a description thereof will be omitted.

Figure 5A:
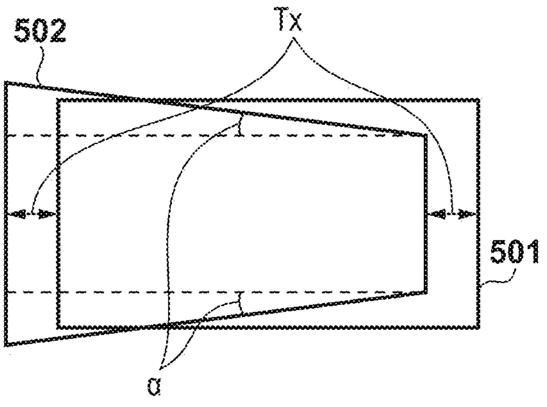
FIG. 5A is a diagram explaining tilt shake according to a second embodiment.
Figure 5B:
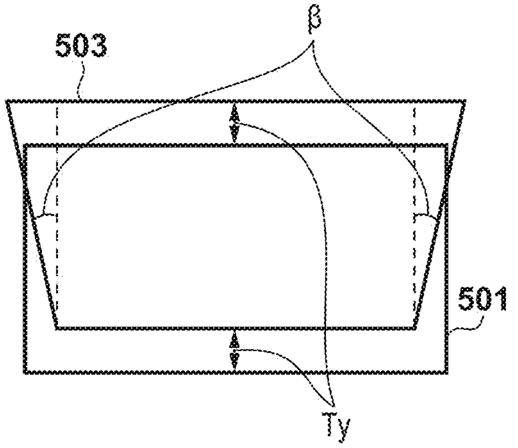
FIG. 5B is a diagram explaining tilt shake according to the second embodiment.

FIGS. 5A and 5B are diagrams for explaining tilt shake. FIG. 5A shows the state when camera shake in the yaw direction occurs. 501 indicates an original image, and 502 indicates an image affected by the camera shake in the yaw direction. When the camera shake in the yaw direction occurs in this way in the camera, tilt shake α occurs in addition to translational shake Tx in the image, causing the shape of the original image distorted into a trapezoid shape.

Similarly, FIG. 5B shows the state when camera shake in the pitch direction occurs. 501 indicates an original image, and 503 indicates an image affected by the camera shake in the pitch direction. When the camera shake in the pitch direction occurs in this way in the camera, tilt shake β occurs in addition to translational shake Ty in the image, causing the shape of the original image distorted into a trapezoid shape.

Figure 6:
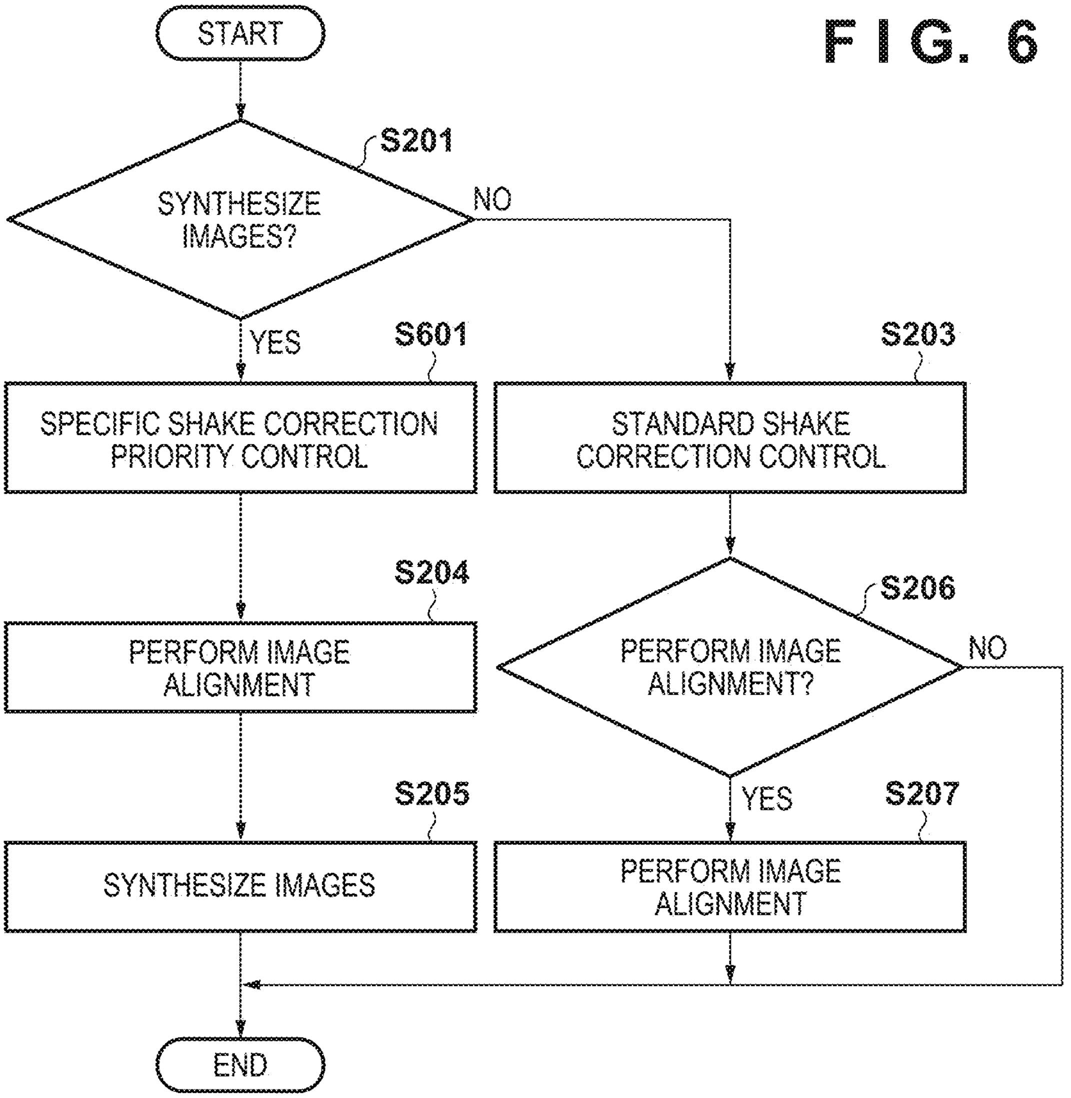
FIG. 6 is a flowchart explaining processing in the second embodiment.

Next, the sensor-shift stabilization operation according to the second embodiment will be described with reference to the flowchart shown in FIG. 6. In FIG. 6, the same processes as those shown in FIG. 3 are denoted by the same step numbers, and the description thereof will be omitted as appropriate.

In the second embodiment, when performing image synthesis, in step S601, the image stabilization control unit 53 of the camera system control circuit 5 controls the sensor-shift stabilization so as to give priority to correcting a specific shake among translational shake, rotational shake, and tilt shake. Hereinafter, this control will be referred to as "specific shake correction priority control."

When attempting to correct tilt shake during image alignment, pixel interpolation occurs, as in the case of rotational shake, resulting in degradation of image quality. Therefore, when performing image synthesis stabilization, it is preferable to correct tilt shake in addition to rotational shake using the sensor-shift stabilization.

Figure 7:
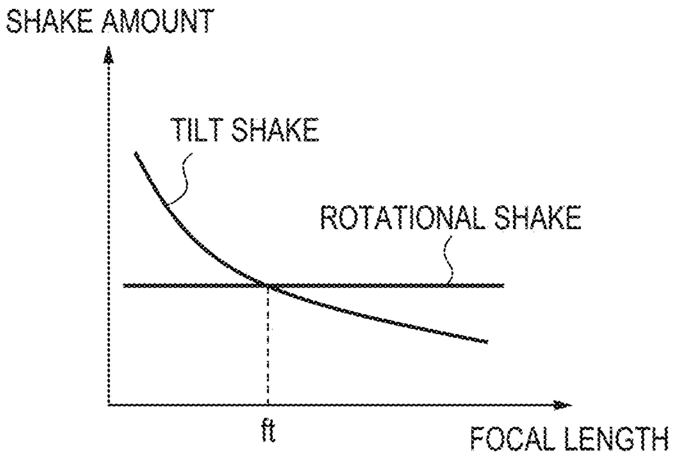
FIG. 7 is a diagram explaining the relationship between amounts of rotational shake and tilt shake, and focal length according to the second embodiment.

The priority of correction for rotational shake and tilt shake differs depending on the focal length. FIG. 7 shows the relationship between the amounts of rotational shake and tilt shake, and the focal length. In a region where the focal length is shorter than ft, tilt shake is dominant, and in a region where the focal length is longer than ft, rotational shake is dominant. Therefore, when the focal length is shorter than a predetermined focal length, correction is prioritized in the order of tilt shake>rotational shake>translational shake, and when the focal length is equal to or greater than the predetermined focal length, correction is prioritized in the order of rotational shake>tilt shake>translational shake.

As described above, according to the second embodiment, by correcting tilt shake in addition to rotational shake using the sensor-shift stabilization, it is possible to perform the image synthesis stabilization with less image quality degradation.

Third Embodiment

Next, a third embodiment of the present invention will be described.

When correcting camera shake by synthesizing a plurality of images as described in the first and second embodiments, if the images are not aligned properly and are misaligned before synthesizing, a double-vision image will be generated. Accordingly, in this embodiment, a case where the reliability of the alignment is determined will be described.

Figure 8:
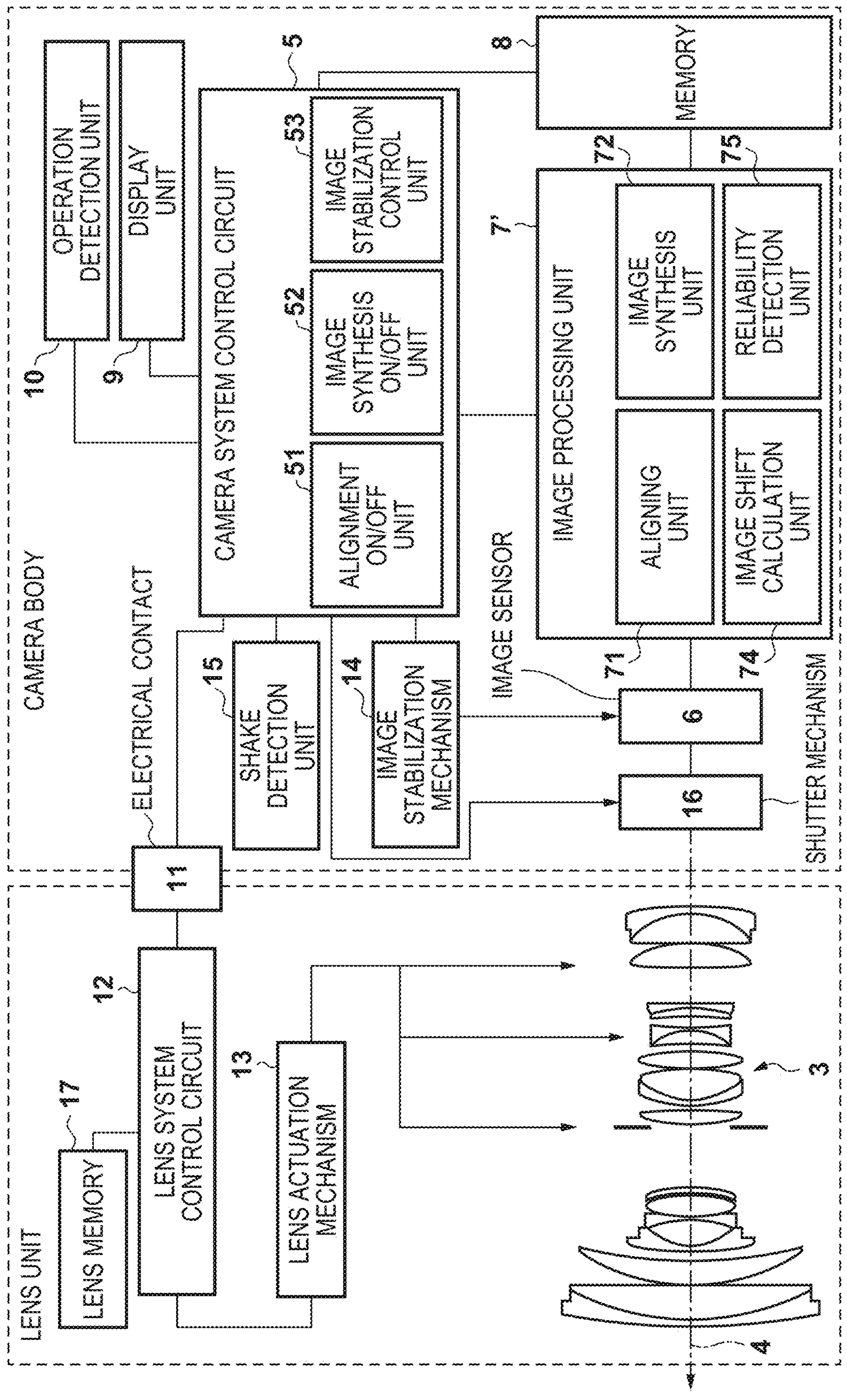
FIG. 8 is a block diagram illustrating a brief configuration of an image capturing system according to a third embodiment of the present invention.

FIG. 8 is a diagram showing a schematic configuration of an image capturing system according to the third embodiment. Compared to the configuration of the image capturing system shown in FIG. 1B, the difference is that an image processing unit 7' further includes an image shift calculation unit 74 and a reliability detection unit 75. The rest of the configuration is the same as that described with reference to FIGS. 1A, 1B and 2, and therefore description thereof will be omitted.

Figure 9A:
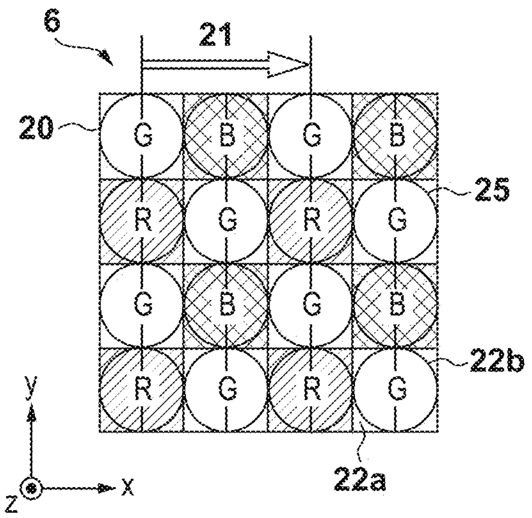
FIG. 9A is a diagram for explaining the structure of an image sensor according to the third embodiment.
Figure 9B:
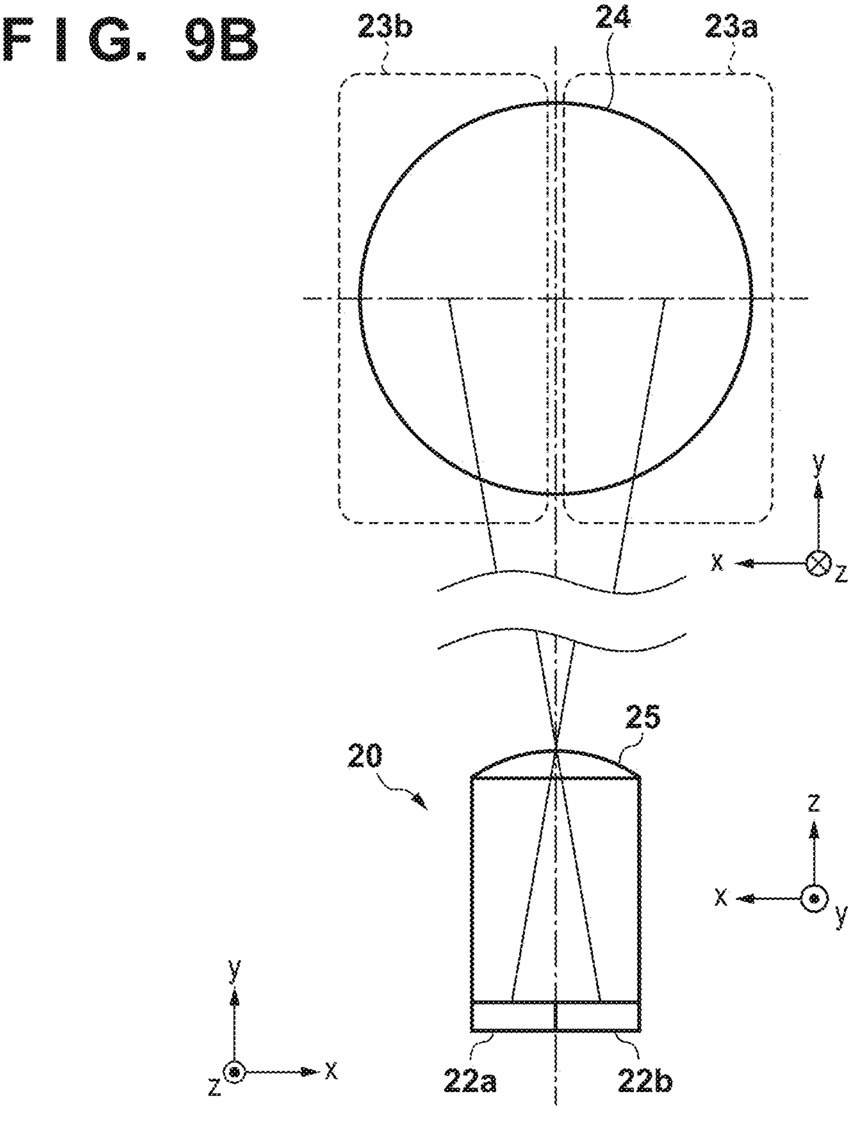
FIG. 9B is a diagram for explaining the structure of the image sensor according to the third embodiment.

FIGS. 9A and 9B are diagrams showing the configuration of the image sensor 6 in the third embodiment. FIG. 9A is an enlarged view of part of the pixels 20 (4×4 pixels) of the image sensor 6 as viewed from the direction of the optical axis 4, and FIG. 9B is a diagram showing a cross-sectional view (lower part) of one pixel 20 and the correspondence with the exit pupil of the imaging lens. Note that the projection directions are different between the lower part and upper part of FIG. 9B, but this illustration method is taken to make it easier to understand the correspondence state on the pupil plane.

In the example shown in FIG. 9A, the image sensor 6 is covered with a color filter in a so-called Bayer array, and R, G, and B indicate the colors of the color filters, red, green, and blue, respectively. The circle in each pixel 20 indicates a microlens 25, and the vertical line in each pixel 20 indicates that the light receiving section of each pixel 20 is divided into two light receiving sections 22*a* and 22*b* (photoelectric conversion sections) in the X direction. An arrow 21 indicates the distance between pixels covered with filters of the same color.

In FIG. 9B, reference numerals 23*a* and 23*b* denote areas on the pupil plane of the imaging optical system 3 that correspond to the light receiving sections 22*a* and 22*b*, respectively, and reference numeral 24 denotes the exit pupil of the imaging optical system 3.

As shown in FIG. 9B, the light receiving sections 22*a* and 22*b* of the pixel 20 are conjugated to the partial regions 23*a* and 23*b* of the pupil plane of the imaging optical system 3, respectively, via the microlens 25, and are configured to receive light flux that have passed through different pupil regions of the exit pupil 24.

From the image sensor 6 having the above configuration, signals having parallax (or signals from different viewpoints) obtained by the light receiving sections 22*a* and 22*b* are acquired, and a phase difference calculation can be performed to realize a known phase difference AF. Calculation for the phase difference AF is performed by the camera system control circuit 5. A normal pixel signal can be obtained by adding and outputting the signals obtained by the light receiving sections 22*a* and 22*b* for each pixel 20. In FIG. 9B, the regions 23*a* and 23*b* are shown with a gap therebetween to clearly indicate that they are different regions, but they may actually be in contact with each other or may have overlapping regions. Hereinafter, an image obtained by collecting pixel signals obtained from the light receiving section 22*a* of each pixel 20 will be called an "image A," and an image obtained by collecting pixel signals obtained from the light receiving section 22*b* of each pixel 20 will be called an "image B."

Next, the processes performed by the image shift calculation unit 74 and the reliability detection unit 75 in the third embodiment will be described with reference to FIGS. 10A to 10D.

Figure 10A:
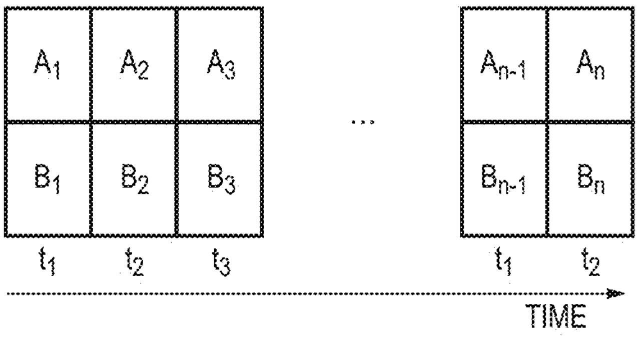
FIG. 10A is a diagram for explaining processing performed by an image shift calculation unit and a reliability detection unit according to the third embodiment.

The horizontal axis in FIG. 10A indicates time. Let $t_1$ be the time when acquisition started, images A and B are acquired continuously at $t_2$ and $t_3$, at a predetermined cycle. Images A and B acquired at time $t_1$ are designated as $A_1$ and $B_1$, respectively. Similarly, images A and B acquired at time $t_n$ are designated as $A_n$ and $B_n$, respectively.

Figure 10B:
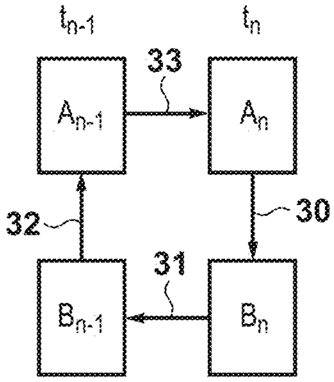
FIG. 10B is a diagram for explaining processing performed by the image shift calculation unit and the reliability detection unit according to the third embodiment.
Figure 10C:
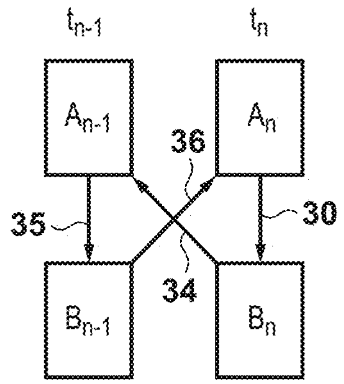
FIG. 10C is a diagram for explaining processing performed by the image shift calculation unit and the reliability detection unit according to the third embodiment.
Figure 10D:
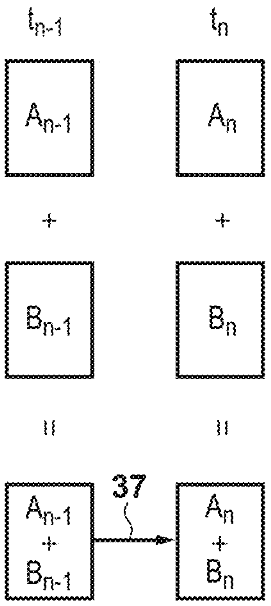
FIG. 10D is a diagram for explaining processing performed by the image shift calculation unit and the reliability detection unit according to the third embodiment.

FIGS. 10B and 10C show an example in which a circulation path is formed between the images A and B acquired at time $t_2$ and subsequent times, and the images A and B acquired before time $t_2$. FIG. 10D, as a comparison with FIGS. 10B and 10C, shows an example in which a circulation path is not formed between the images A and B acquired at time $t_2$ and subsequent times, and the images A and B acquired before time $t_2$.

Referring to FIGS. 10B to 10D, images A and B acquired at times $t_{n-1}$ and $t_n$ are considered. In FIGS. 10B to 10D, images A and B acquired at time $t_{n-1}$ are used as templates for calculating a motion vector. However, if the images acquired at time $t_{n-1}$ were rejected as templates at the previous time, images acquired before time $t_{n-1}$ may be used as templates. The rejection of templates will be described later.

In FIG. 10B, at the timing of time $t_n$, a motion vector 30 from $A_n$ to $B_n$, a motion vector 31 from $B_n$ to $B_{n-1}$, and a motion vector 33 from $A_{n-1}$ to $A_n$ are calculated. As can be seen from the figure, by repeating the calculation of the above motion vectors, as a motion vector in the opposite direction has been calculated by time $t_{n-1}$, so it can be used as a motion vector 32 from $B_{n-1}$ to $A_{n-1}$ after inverting the sign. What is important here is that the four motion vectors 30, 31, 32, and 33 form a path that leaves $A_n$ and returns to $A_n$ without following the same path. In this embodiment, this is called "forming a circulation path." In the example of FIG. 10B, it is clear that a circulation path is formed between the image group ($A_n$, $B_n$) acquired at time $t_2$ and subsequent times and the image group ($A_{n-1}$, $B_{n-1}$) acquired before time $t_2$.

Similarly, in the example of FIG. 10C, at the timing of time $t_n$, a motion vector 30 from $A_n$ to $B_n$, a motion vector 34 from $B_n$ to $A_{n-1}$, and a motion vector 36 from $B_{n-1}$ to $A_n$ are calculated. Note that a motion vector 35 is calculated at time $t_{n-1}$. As can be seen from the figure, these four motion vectors 30, 34, 35, and 36 form a circulation path. The image shift calculation unit 74 of this embodiment operates to form a circulation path in this manner.

As shown in the examples of FIGS. 10B and 10C, a plurality of methods are possible for forming a circulation path, and any method may be set as desired.

However, comparisons between images A and between images B, and between images acquired at the same time are convenient because they are stable with respect to vignetting conditions and the state of the subject. In other words, the example shown in FIG. 10B is a preferable example.

FIG. 10D shows an operation of image shift detection that is normally performed. Unlike this embodiment, in the example of FIG. 10D, an image ($A_n+B_n$) is generated by adding $A_n$ and $B_n$ at the timing of time $t_n$. Then, a motion vector is calculated between the image ($A_n+B_n$) and the template image $A_{n-1}+B_{n-1}$. As is apparent from FIG. 10D, no path that allows circulation is formed.

Next, a method of using the circulation path will be described. In this embodiment, the reliability detection unit 75 accumulates the movement vectors that circulates to return to the original image. If there is no detection error, the accumulation result will be zero because it returns to the original position. On the other hand, if the detection fails for some reason, such as the movement of the subject, an error in a repeating pattern, or a change in the environmental light, the result will not be zero.

Therefore, if the result of the reliability detection unit 75 is greater than a threshold, it is determined that a detection error has occurred. This makes it possible to determine whether the movement vector obtained at time $t_n$ is good or bad at the timing of time $t_n$. When aligning and synthesizing images, it is possible to determine whether to add them or not based on the good or bad judgment at this point, which can save memory.

Furthermore, based on a comparison with a threshold value, it is possible to determine whether or not to update the template. If it is equal to or less than the threshold, the image at time $t_n$ is used as a template for the image to be acquired at the next time, and if it is greater than the threshold, the template is not updated. This makes it possible to perform stable synthesis processing by excluding a single frame of image with different characteristics (e.g., positioning fails due to flickering) if such the image is acquired.

In the above example, the light receiving portion of each pixel 20 is divided into two light receiving portions 22*a* and 22*b* in the X direction, but the present invention is not limited to this. For example, it may be divided in the Y direction, or the division directions may be mixed. Furthermore, the number of divisions is not limited to two, and the number of divisions may be three or more. In either case, the reliability of the alignment can be determined by using the method that uses the motion vectors between the images, as described above.

In this embodiment, the image capturing apparatus is provided with the image shift calculation unit 74 and the reliability detection unit 75, but the present invention is not limited to this. As another configuration, for example, the image A group and the image B group may be stored using the optical system shown in this embodiment, and processed later. In that case, the image shift calculation unit 74 and the reliability detection unit 75 are realized in the form of a computer program or the like, and process the stored image A group and the image B group described above. The processing content is as exemplified in this embodiment, and the image shift amounts are calculated so as to form a circulation path between the image groups acquired at time $t_2$ and subsequent times and the image groups before time $t_2$, and the detected amounts along the above-mentioned circulation path are accumulated. By using this result, it is possible to determine the quality of the motion vector calculated at time $t_n$ at the timing of time $t_n$. In this case, as in the example of the image capturing apparatus, memory can be saved and memory access can be reduced, allowing for high-speed calculation.

As described above, according to the third embodiment, the reliability of alignment can be determined with a simple configuration.

Fourth Embodiment

Next, a fourth embodiment of the present invention will be described.

Figure 11A:
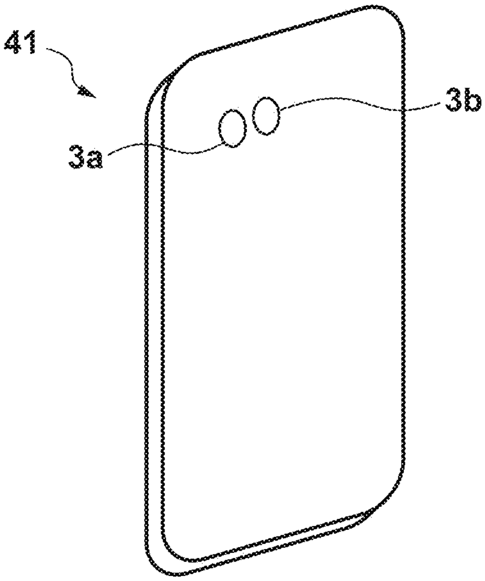
FIG. 11A is a schematic external view of an image capturing apparatus according to a fourth embodiment.
Figure 11B:
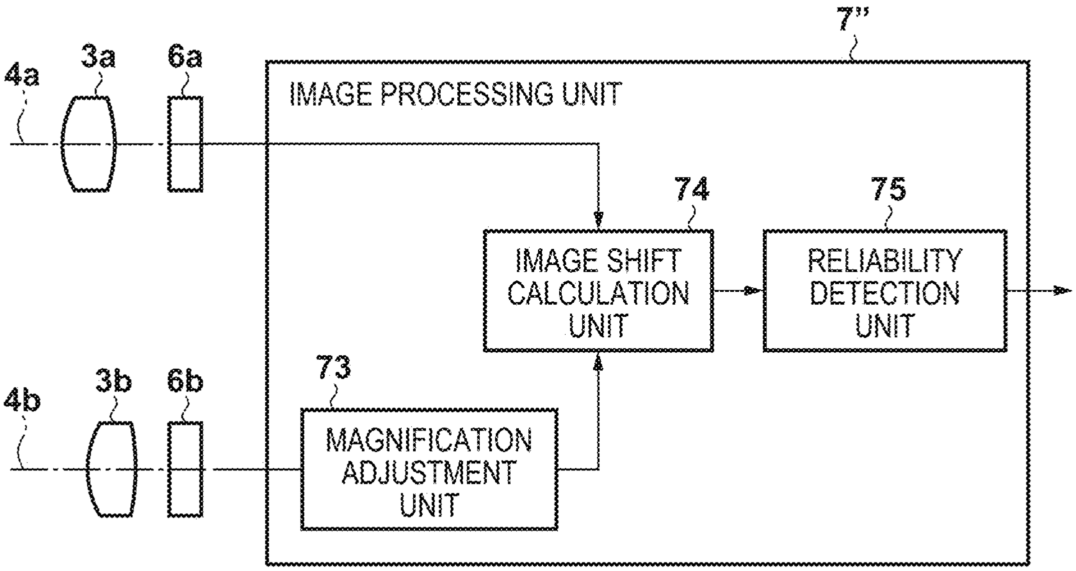
FIG. 11B is a block diagram illustrating the configuration of an image processing unit of the image capturing apparatus according to the fourth embodiment.

FIG. 11A is a schematic external view of a smartphone 41 as an image capturing apparatus in the fourth embodiment, and FIG. 11B is a block diagram mainly showing the configuration of an image processing unit 7". The smartphone 41 in the fourth embodiment will be described as including a so-called multi-lens camera having two imaging optical systems 3*a*, 3*b* and two image sensors 6*a*, 6*b*. The imaging optical systems 3*a*, 3*b* have different focal lengths and can capture images with different angles of view. Here, it is assumed that the imaging optical system 3*b* has a shorter focal length. In addition, since the imaging optical systems 3*a* and 3*b* are spaced apart, it is possible to capture a group of images from a plurality of viewpoints simultaneously. Reference numerals 4*a* and 4*b* indicate optical axes of the imaging optical systems 3*a* and 3*b*, respectively.

Note that the circuit configuration other than that described above is similar to that shown in FIG. 1B. As the processing in the image processing unit 7" is different, which will be explained below. In this embodiment, the image processing unit 7" includes a magnification adjustment unit 73 in addition to the configuration of the image processing unit 7' in FIG. 8.

In this embodiment, an image obtained from the image sensor 6*a* is referred to as an image A. Meanwhile, an image obtained from the image sensor 6*b* is sent to the magnification adjustment unit 73 and converted into an image with a state comparable to an image obtained from the image sensor 6*a*. Specifically, a part of the image obtained with a wider angle of view is cropped, and a process to match the pixel pitch is performed. The output image of this magnification adjustment unit 73 is referred to as an image B.

Then, by using the acquired images A and B, the images A and B are processed as described in the third embodiment with reference to FIGS. 10A to 10D. That is, the image shift calculation unit 74 calculates an image shift amount so that a circulation path is formed between the second and subsequent image groups and the image groups acquired before. Then, the reliability detection unit 75 accumulates the detected amounts along the circulation path. As a result, the same effect as in the third embodiment can be obtained.

In this embodiment, the smartphone 41 has been described as having two imaging optical systems 3*a*, 3*b* and two image sensors 6*a*, 6*b*. However, the imaging system may be three or more systems, in which case the required number of magnification adjustment units 73 are provided.

Furthermore, the present embodiment is not limited to being applied to smartphones, but can also be applied to electronic devices capable of processing images.

Furthermore, the present invention may be applied to a system made up of a plurality of devices, or to an apparatus made up of a single device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to perform sensor-shift stabilization control suitable for moving images and still images, and also to improve the image quality of a synthesized image in a case where a plurality of images are synthesized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising one or more processors and/or circuitry which function as:

an image sensor that photoelectrically converts light incident via an imaging optical system and outputs an image;

a shake detection unit that detects shake of the image capturing apparatus; and an actuation unit that performs translational actuation and rotational actuation on the image sensor in a plane perpendicular to an optical axis of the imaging optical system so as to correct the shake detected by the shake detection unit, wherein, in a case where each of a plurality of images output from the image sensor is aligned by translational actuation by an integer multiple of pixel and the plurality of aligned images are synthesized, the actuation unit performs both of the translational actuation and the rotational actuation to correct the shake with the rotational actuation being performed in preference to the translational actuation.

2. The image capturing apparatus according to claim 1, wherein, in a case where the plurality of images are synthesized, the actuation unit sets an upper limit value of the rotational actuation higher than an upper limit value of the translational actuation.

3. The image capturing apparatus according to claim 1, wherein the actuation unit sets an upper limit value of the rotational actuation higher in a case where the plurality of images are synthesized than in a case where the synthesis is not performed.

4. The image capturing apparatus according to claim 1, wherein the one or more processors and/or circuitry further function as a setting unit that sets whether or not to synthesize the plurality of images, wherein the setting unit sets to synthesize the plurality of images in a case where a user instructs to synthesize images or in a case where a shutter speed is slower than a threshold in a still image shooting mode.

5. The image capturing apparatus according to claim 1, wherein the one or more processors and/or circuitry further function as a setting unit that sets whether or not to synthesize the plurality of images, wherein the setting unit sets not to synthesize images in a case where a user does not instruct to synthesize images, in a case where a shutter speed is faster than a threshold in a still image shooting mode, or in a case where the image shooting mode is a moving image shooting mode.

6. The image capturing apparatus according to claim 1, wherein the actuation unit further performs tilt actuation in a rotational direction around an axis perpendicular to the optical axis, and in a case where the plurality of images are synthesized, the actuation unit performs the rotational actuation and the tilt actuation with priority over the translational actuation, and in a case where a focal length of the imaging optical system is shorter than a predetermined focal length, performs the tilt actuation with priority over the rotational actuation, and in a case where the focal length is equal to or longer than the predetermined focal length, performs the rotational actuation with priority over the tilt actuation.

7. The image capturing apparatus according to claim 1, wherein the one or more processors and/or circuitry further function as:

an alignment unit that performs aligning the plurality of images output from the image sensor in a case where the plurality of images are synthesized; and a synthesis unit that synthesizes the plurality of images aligned by the alignment unit.

8. The image capturing apparatus according to claim 7, wherein the image sensor is capable of outputting a first image and a second image having different viewpoints based on light incident via the imaging optical system, further comprising:

a calculation unit that calculates a motion vector indicating a mutual deviation between a plurality of the first images obtained at a first timing and a second timing prior to the first timing, and a plurality of the second images obtained at the first timing and the second timing, which are aligned by the alignment unit; and a reliability detection unit that detects the reliability of the alignment by the alignment unit by integrating the motion vector obtained by the calculation unit, wherein if the reliability determined by the reliability detection unit is lower than a predetermined threshold, the first image and the second image obtained at the first timing are not used for synthesis by the synthesis unit.

9. The image capturing apparatus according to claim 8, wherein the calculation unit forms a circulation path of the motion vector between a plurality of the first images and the second images aligned by the alignment unit.

10. The image capturing apparatus according to claim 9, wherein the calculation unit calculates a first motion vector from the first image to the second image both obtained at the first timing and aligned by the alignment unit, a second motion vector from the second image obtained at the first timing to the second image obtained at the second timing, a third motion vector from the second image to the first image both obtained at the second timing, and a fourth motion vector from the first image obtained at the second timing to the first image obtained at the first timing, and the reliability detection unit detects the reliability by integrating the first to fourth motion vectors.

11. The image capturing apparatus according to claim 8, wherein the calculation unit calculates a first motion vector from the first image to the second image both obtained at the first timing and aligned by the alignment unit, a second motion vector from the second image obtained at the first timing to the first image obtained at the second timing, a third motion vector from the first image to the second image both obtained at the second timing, and a fourth motion vector from the second image obtained at the second timing to the first image obtained at the first timing, and the reliability detection unit detects the reliability by integrating the first to fourth motion vectors.

12. The image capturing apparatus according to claim 8, wherein the image sensor includes an image sensor having a plurality of pixels each including a first photoelectric conversion unit and a second photoelectric conversion unit that photoelectrically convert light that has passed through different pupil regions of the imaging optical system, and the first image corresponds to an image signal photoelectrically converted by the first photoelectric conversion units, and the second image corresponds to an image signal photoelectrically converted by the second photoelectric conversion units.

13. The image capturing apparatus according to claim 8, wherein the image sensor includes a first image sensor and a second image sensor that photoelectrically convert light incident via a plurality of imaging optical systems, and the first image corresponds to an image signal photoelectrically converted by the first image sensor, and the second image corresponds to an image signal photoelectrically converted by the second image sensor.

14. The image capturing apparatus according to claim 1, wherein the actuation unit determines an actuation amount for the rotational actuation first, then determines an actuation amount for the translational actuation.

15. An image capturing apparatus comprising one or more processors and/or circuitry which function as:

an image sensor that photoelectrically converts light incident via an imaging optical system and outputs an image;

a shake detection unit that detects shake of the image capturing apparatus; and an actuation unit that performs translational actuation and rotational actuation on the image sensor in a plane perpendicular to an optical axis of the imaging optical system so as to correct the shake detected by the shake detection unit, wherein the actuation unit performs both the translational actuation and the rotational actuation regardless of whether a plurality of images are synthesized or not, and sets an upper limit value of the rotational actuation higher in a case where a plurality of images are synthesized than in a case where the synthesis is not performed.

16. A control method of an image capturing apparatus comprising:

photoelectrically converting light incident via an imaging optical system by an image sensor and outputting an image;

detecting shake of the image capturing apparatus; and performing translational actuation and rotational actuation on the image sensor in a plane perpendicular to an optical axis of the imaging optical system so as to correct the detected shake, wherein, in a case where each of a plurality of images output in the image sensing step is aligned by translational actuation by an integer multiple of pixel and the plurality of aligned images are synthesized, in the actuation step, both of the translational actuation and the rotational actuation are performed to correct the shake with the rotational actuation being performed in preference to the translational actuation.

17. A control method of an image capturing apparatus comprising:

photoelectrically converting light incident via an imaging optical system by an image sensor and outputting an image;

detecting shake of the image capturing apparatus; and performing translational actuation and rotational actuation on the image sensor in a plane perpendicular to an optical axis of the imaging optical system so as to correct the detected shake, wherein both the translational actuation and the rotational actuation are performed regardless of whether a plurality of images are synthesized or not, and an upper limit value of the rotational actuation is set higher in a case where a plurality of images are synthesized than in a case where the synthesis is not performed.

18. A non-transitory computer-readable storage medium, the storage medium storing a program that is executable by the computer, wherein the program includes program code for causing a computer to execute each step of a method of controlling an image capturing apparatus comprising:

photoelectrically converting light incident via an imaging optical system by an image sensor and outputting an image;

detecting shake of the image capturing apparatus; and performing translational actuation and rotational actuation on the image sensor in a plane perpendicular to an optical axis of the imaging optical system so as to correct the detected shake, wherein, in a case where each of a plurality of output images is aligned by translational actuation by an integer multiple of pixel and the plurality of aligned images are synthesized, both of the translational actuation and the rotational actuation are performed to correct the shake with the rotational actuation being performed in preference to the translational actuation.

19. A non-transitory computer-readable storage medium, the storage medium storing a program that is executable by the computer, wherein the program includes program code for causing a computer to execute each step of a method of controlling an image capturing apparatus comprising:

photoelectrically converting light incident via an imaging optical system by an image sensor and outputting an image;

detecting shake of the image capturing apparatus; and performing translational actuation and rotational actuation on the image sensor in a plane perpendicular to an optical axis of the imaging optical system so as to correct the detected shake, wherein both the translational actuation and the rotational actuation are performed regardless of whether a plurality of images are synthesized or not, and an upper limit value of the rotational actuation is set higher in a case where a plurality of images are synthesized than in a case where the synthesis is not performed.

* * * * *